US007363546B2

United States Patent
Duncan

(10) Patent No.: US 7,363,546 B2
(45) Date of Patent: Apr. 22, 2008

(54) LATENT FAULT DETECTOR

(75) Inventor: William L. Duncan, Berthoud, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 783 days.

(21) Appl. No.: 10/209,038

(22) Filed: Jul. 31, 2002

(65) Prior Publication Data

US 2004/0078697 A1 Apr. 22, 2004

(51) Int. Cl.
*G06F 11/00* (2006.01)
(52) U.S. Cl. .............................. 714/40; 714/42; 714/44
(58) Field of Classification Search ................... 714/40, 714/42, 44, 36; 713/2
See application file for complete search history.

(56) References Cited

U.S. PATENT DOCUMENTS

| | | | | |
|---|---|---|---|---|
| 4,438,494 | A | * | 3/1984 | Budde et al. .................... 714/2 |
| 5,050,070 | A | * | 9/1991 | Chastain et al. ............. 712/203 |
| 5,140,594 | A | * | 8/1992 | Haulin ......................... 714/797 |
| 5,200,963 | A | * | 4/1993 | Chau et al. .................. 714/820 |
| 5,404,363 | A | * | 4/1995 | Krause et al. ............... 714/814 |
| 5,805,796 | A | * | 9/1998 | Finch et al. .................... 714/40 |
| 6,009,541 | A | * | 12/1999 | Liu et al. ....................... 714/36 |
| 6,029,257 | A | * | 2/2000 | Palmer ......................... 714/40 |
| 2003/0061535 | A1 | * | 3/2003 | Bickel .......................... 714/11 |

OTHER PUBLICATIONS

Kari et al. "Detection of defective media in disks." The IEEE International Workshop on Defect and Fault Tolerance in VLSI Systems 1993, Oct. 27-29, 1993, pp. 49-55.*

Kari et al. "Detecting latent sector faults in modern SCSI disks." Proceedings of the Second International Workshop onModeling, Analysis, and Simulation of Computer and Telecommunication Systems, 1994, Publication Date: Jan. 31-Feb. 2, 1994, pp. 403-404.*

Kari, Hannu H. "Latent sector faults and reliability of disk arrays." WWW copy of dissertation in Helsinki Univ of Tech, Espoo, Finland. chapters 1-5, 10, and 11. dated Apr. 1997, retrieved Jul. 25, 2005 from http://www.cs.hut.fi/~hhk/phd/phd.html.*

"scsi_disk—SCSI direct access (disk) device driver," Hewlett-Packard Company, HP-UX Release 9.0, Aug. 1992, 4 pages.

* cited by examiner

*Primary Examiner*—Robert Beausoliel
*Assistant Examiner*—Philip Guyton
(74) *Attorney, Agent, or Firm*—Robert C. Kowert; Meyertons, Hood, Kivlin, Kowert & Goetzel, P.C.

(57) ABSTRACT

A latent error detector may be configured to reveal latent errors within a plurality of components within a computer system. The latent error detector may be configured to access configuration data specifying one or more types of components and one or more modules for each type of component. The one or more modules for each type of component may be configured to initiate a component-specific operation to reveal a latent error within the one or more components of the one or more types of components. A framework may be configured to call the one or more modules for each type of component. The framework may be configured as a main software module to access the one or more modules.

37 Claims, 5 Drawing Sheets

LATENT FAULT DETECTOR

BACKGROUND

1. Field of the Invention

This invention relates to computer systems, and more particularly to error detection in computer systems.

2. Description of the Related Art

With the growing deployment of computer systems and software, applications often operate in distributed, heterogeneous environments. Processing in a complex application may be partitioned across network segments, CPU clusters and storage locations. Furthermore, computer systems in distributed, heterogeneous environments may include many different components that impact overall reliability and/or availability of the systems. For example, one or more of the computer systems may have storage device arrays that must operate correctly in order for applications and/or other components to operate correctly. In addition, the computer systems may rely upon network adapters to provide a connection to the storage device arrays. The network adapters must operate correctly in order for applications relying on the connection to the storage device arrays to operate correctly. Thus, there may be numerous types of components operating in computer systems that impact the overall reliability and/or availability of the systems.

The increasing complexity of software and the increasing degree of dependence on computer systems have imposed adoption of various techniques to obtain maximum reliability and availability. Unfortunately, unreliable components operating in a computer system may directly impact availability of the components. The reliability of an individual component refers to how likely the component is to remain working without a failure being encountered, typically measured over some period of time. The reliability of a computer system is a function of the reliability of the components in the system. In general, the more components operating in the computer system, the worse the reliability of the system is as a whole. The reliability of many components, such as network adapters and storage device arrays, is often expressed in terms of mean time between failure (MTBF).

Numerous problems may arise while implementing solutions to increase the reliability and/or availability of individual components, and thus, the reliability and/or availability of computer systems as a whole. For example, although storage device arrays may be used to increase availability of a system by storing redundant data, the ability to reconstruct lost data may depend on how many failures have already occurred. A redundant array of inexpensive disk (RAID) component in a computer system may only be able to tolerate a single disk failure. Therefore, once a single disk fails, if additional disks fail before lost data on the failed disk has been reconstructed, it may no longer be possible to reconstruct any lost data. Such systems are said to be operating in a degraded mode. The longer a storage device array operates in a degraded mode, the more likely it is that an additional failure will occur. As a result, a storage device array operating in a degraded mode decreases reliability of the storage device array and may actually cause data loss before a problem with the component is identified.

Another potential problem that may affect the reliability and/or availability of a component is that errors other than total failures may occur. Like total failures, these errors may cause data vulnerability or data loss. For example, disk drives may occasionally corrupt data. Data corruption may occur for different reasons. For example, bugs in a disk drive controller's firmware may cause bits in a sector to be modified or may cause blocks to be written to the wrong address. Such bugs may cause disk drives to write the wrong data, to write the correct data to the wrong place, or to not write any data at all. Another source of errors with a component in a computer system may be a drive's write cache. Many disk drives use write caches to quickly accept write requests so that a host computer or array controller can continue with other commands. The data is later copied from the write cache to the disk drive. However, write cache errors may cause some acknowledged writes to never reach the disk drive. The end result of such bugs or errors is that the data at a given block may be corrupted or stale. These types of errors may be "latent" because the disk drive may not realize that it has erred. If left latent, such errors may have detrimental consequences such as undetected long-term data corruption.

Latent errors may be present within many different types of components. A component may not show or present signs of a problem even though the component is operating in a degraded state. In fact, the computer system may be completely unaware of an existence of a latent error. For example, one network card within a complex distributed network may fail and the failure may not become known until the computer system attempts to use the network card.

SUMMARY

A latent error detector may be configured to reveal latent errors within a plurality of components within a computer system. The latent error detector may be configured to access configuration data specifying one or more types of components and one or more modules for each type of component. The one or more modules for each type of component may be configured to initiate a component-specific operation to reveal a latent error within the one or more components of the one or more types of components. A framework may be configured to call the one or more modules for each type of component. The framework may be configured as a main software module to access the one or more modules.

The latent error detector may be configured to check for latent errors for a new type of component by including a new module in the one or more modules associated with the new type of component and by specifying the new type of component in the configuration data. The latent error detector may be configured to eliminate checking for latent errors for a specific type of component by removing an existing module associated with the specific type of component from the one or more modules and by removing the specific type of component from the configuration data.

The framework may be configured to begin execution as a background process as part of a computer system's boot or reboot process. Each of the one or more modules may be configured to reveal multiple types of latent errors within the one or more components of the one or more types of components. Each of the one or more modules may be a dynamic shared object configured to operate with the framework without imposing modifications to the framework. In one embodiment, the framework may be configured as a scheduler. The framework may be configured to call modules at different intervals. The framework may also be configured to call modules one at a time or concurrently. In other embodiments, the framework may call each module continually based on current system load. The configuration data may further specify how the framework will call each of the modules.

A method to reveal latent errors within a plurality of components may access configuration data that specifies one or more types of components and one or more modules for each type of component. The plurality of components may comprise one or more components of the one or more types of components. Each of the one or more modules may be called from a framework configured to access the one or more modules. In one embodiment, the framework may be configured as a scheduler. A new module may be added in the one or more modules associated with a new type of component to check for latent errors within the new type of component and the new type of component may be specified in the configuration data. An existing module may be removed in the one or more modules associated with a specific type of component to eliminate checking for latent errors for the specific type of component and the specific type of component may be removed from the configuration data.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
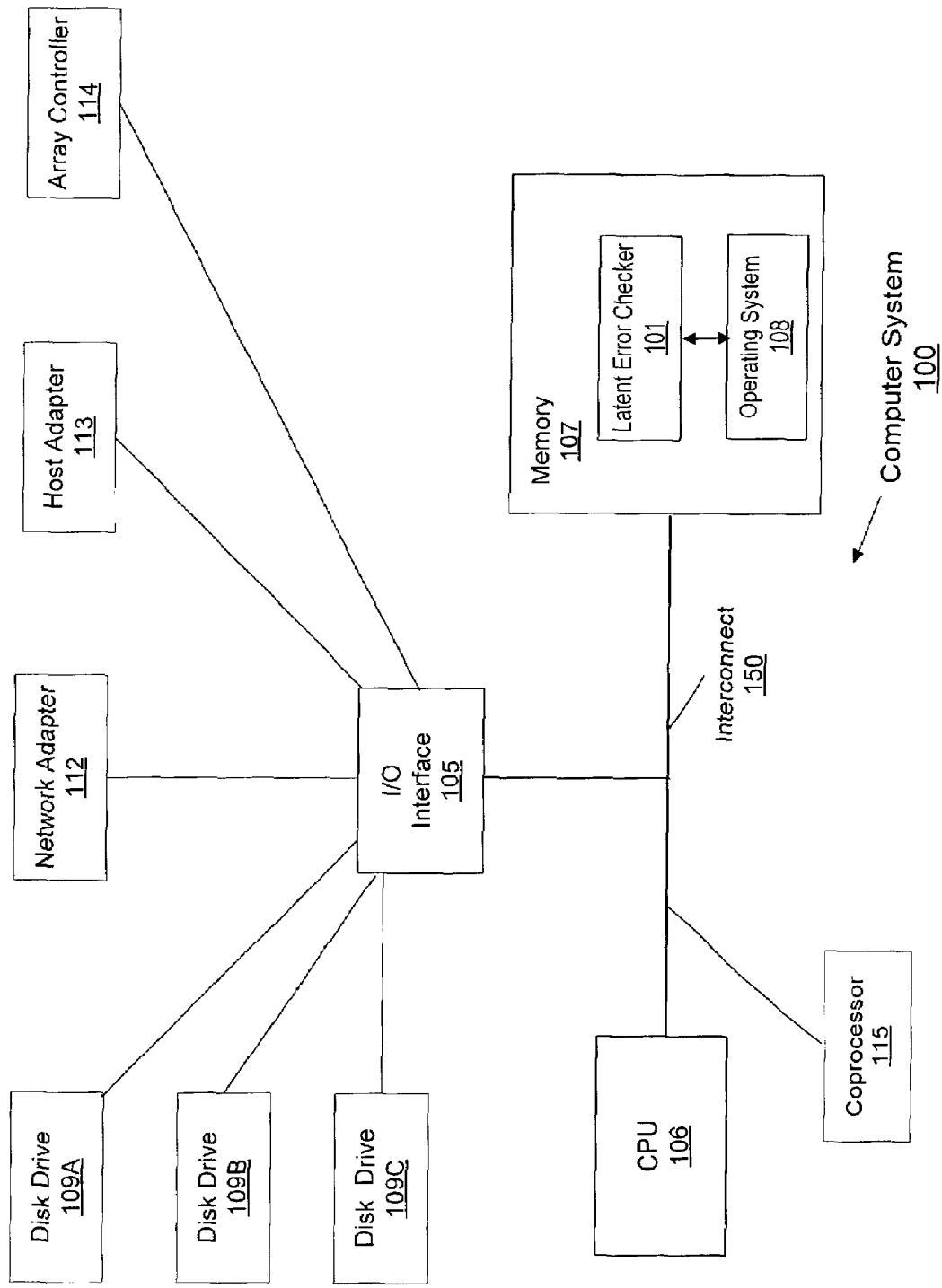
FIG. 1 illustrates a computer system including a latent error detector to identify undetected errors within one or more components accessible by the system, according to one embodiment.

FIG. 1 illustrates one embodiment of a computer system 100 that may include a latent error detector 101 to identify undetected errors with various components coupled to the system. Computer system 100 may include many different components such as memory 107, a central processing unit (CPU) or processor 106, an input/output (I/O) interface 105, operating system 108 and device interconnect 150.

Interconnect 150 is relied upon to communicate data from one component to another. For example, interconnect 150 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

Memory 107 may store program instructions accessed by the CPU 106. For example, instructions and data implementing a latent error detector 101 may be stored in memory 107. An operating system 108 may also be stored in memory 107.

Computer system 100 may further include other software and hardware components, such as an input/output (I/O) interface 105, that may be coupled to various other components and memory 107. The CPU 106 may acquire instructions and/or data through the I/O interface 105. Through the I/O interface 105, the CPU 106 may also be coupled to one or more other components 109 to 114. As illustrated, components 109 to 114 may include storage devices 109, a network adapter 112, a host adapter 113 and/or an array controller 114. Some components 109 to 114 may be coupled to the I/O interface 105. In addition, the computer system 100 may include one or more of a particular type of component. For example, the computer system 100 may include three disk drives as illustrated by component 109A, component 109B and component 109C.

The computer system 100 may include one or more components coupled to the system through a component other than the I/O interface 105. For example, component 115 may be a coprocessor and may be coupled to the system through the interconnect 150. Some computer systems may include additional and/or other components than shown in FIG. 1 such as application software (e.g., stored in memory 107), other CPUs, video monitors or other displays, track balls, mice, keyboards, printers, plotters, scanners, or other types of I/O devices for use with computer system 100.

The latent error detector 101 may identify undetected errors within one or more components coupled to the computer system 100. The components may include software and/or hardware components. One or more components may be relied upon to perform specific operations associated with the overall operations of the system. Errors may exist within one or more components of the computer system. Until an error is discovered, the error may be deemed latent, or dormant. The latent error detector may initiate an operation to check for latent errors involving a particular component. For example, the latent error detector may initiate a read operation involving a disk drive 109. A check operation may involve any action suitable for revealing an error within the component. For example, the check operation may involve executing a command in order to determine if a component is still accessible to the computer system before the component is needed by the computer system. If the component cannot perform the check operation initiated by the latent error detector 101 due to an error within the component, the component may generate an error indication. Thus, the latent error detector 101 may reveal a latent error within the component.

The latent error detector 101 may be configurable to identify latent errors within different types of components. For example, the latent error detector 101 may be configured to identify latent errors within disk drives 109A to 109C and network adapter 112. The latent error detector may later be reconfigured to identify latent errors within disk drives 109A to 109C and host adapter 113. Thus, the latent error detector may be reconfigured to include or remove detection of latent errors within different types of components.

Figure 2:
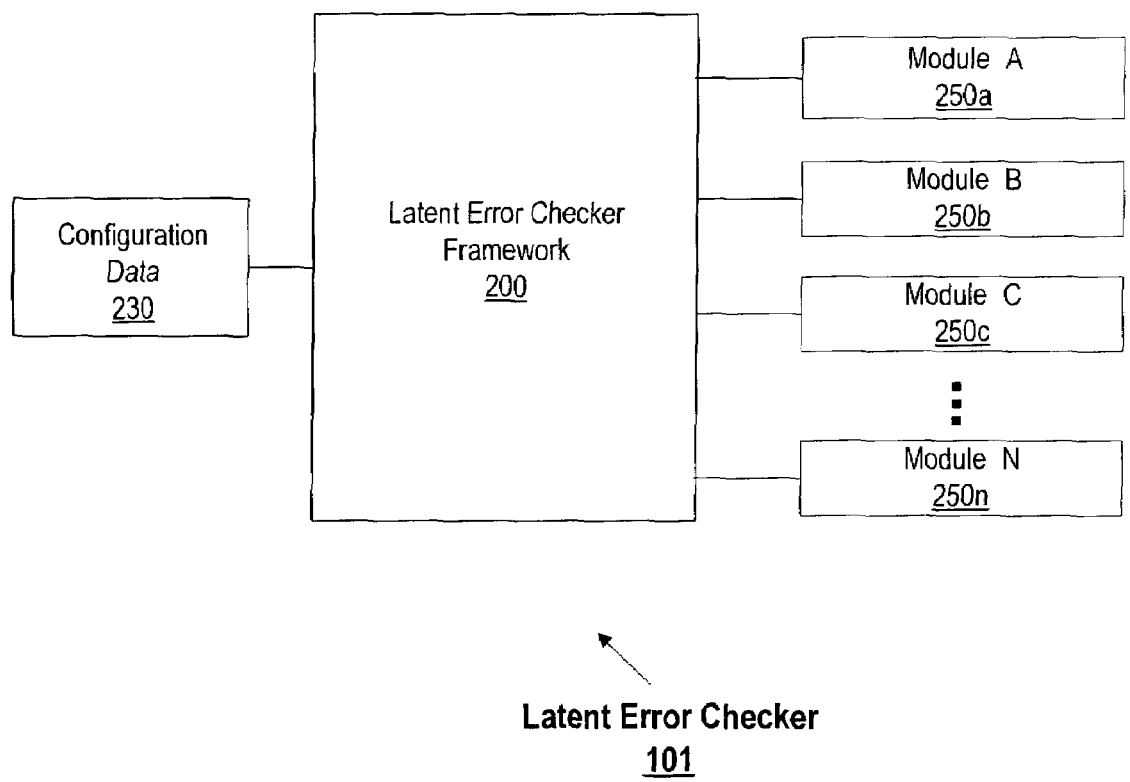
FIG. 2 illustrates one embodiment of the latent error detector as shown in FIG. 1.

FIG. 2 illustrates one embodiment of the latent error detector 101. The latent error detector 101 may include latent error detector framework 200, one or more modules 250a to 250n and configuration data 230. The latent error detector framework 200 may be a software program and may be configured as a base module, or main module, for accessing one or more other modules such as modules 250a to 250n. In one embodiment the framework may run as an operating system daemon. Depending on configuration data 230, the framework 200 may be configured to detect latent errors within one or more components accessible by the computer system. The configuration data 230 may identify which components to check and which modules to use to detect latent errors for each type of component. The modules 250a to 250n, as identified in configuration data 230 for each type of component, may be called from the latent error detector framework 200. Each module may cause a component-specific operation to be initiated to discover a latent error within a specific type of component.

In one embodiment, the framework 200 may be configured to schedule execution of the modules to check for latent errors. For example, the framework 200 may be configured call a module a certain time intervals that initiates a component-specific operation to reveal latent errors. The framework 200 may be configured to call modules 250a to 250n periodically or at different intervals. In some embodiments, the framework 200 may be configured to call module(s) 250 to perform error checking according to availability of system resource. For example, the framework may monitor system activity and schedule modules for execution during times on no activity or when system activity is below a certain load threshold. In one embodiment, the framework may schedule module(s) 250 as low priority tasks such that an operating system will run the module(s) 250 only if no higher priority tasks are pending. The framework 200 may also be configured to call modules 250a to 250n one at a time or concurrently. In other embodiments, the framework 200 may call each module 250a to 250n continually based on current system load. Scheduling information for the modules may be specified in the configuration data. The scheduling information may be specified for all modules or for each individual module. The scheduling configuration data may specify one or more parameters such as error checking frequency, time intervals, system load threshold, etc. In one embodiment, the framework 200 may be configured as an operating system daemon. The framework 200 daemon may be configured as a low priority background process so that the operating system will schedule more critical tasks or foreground tasks ahead of error checking task initiated by the daemon.

In one embodiment, the framework 200 may be configured to call one or more modules that each performs a specific check operation. Each module may be executed to initiate one or more check operations involving a particular type of component in order to detect errors within that type of component. For example, a module designed to test a storage device may generate one or more read commands in order to reveal errors (if any) within the storage device. For example, the module may initiate reads to each block of the storage device in order to cause errors within the storage device to be detected. In one embodiment, the module may initiate a combination of read and write commands to reveal errors within the storage device. In other embodiments, the module may initiate a check operation that involves completion or execution of an event by the component under test. For example, a module designed to reveal latent errors within an intelligent or smart disk drive may initiate a check operation that includes waiting for the disk drive to self-correct an error or perform a self-test. The smart disk drive may be configured to identify and correct some errors. If the smart disk cannot self-correct the error, the smart disk may generate an error indication.

The framework 200 may be configured to allow addition and/or removal of component-specific modules. In one embodiment, one or more pluggable modules, such as modules 250a to 250n in FIG. 2, may be configured to perform a check operation with a specific type of component that causes a latent error within that type of component to be detected. One or more components may be categorized as a type of component based on whether those components perform similar or same operations. For example, smart storage devices may perform similar or same operations in the same way, so the smart storage devices may be grouped as one type of component. Network adapters may perform similar or same operations in the same way, so the network adapters may be grouped as one type of component. Conversely, for example, although a flash disk component and a RAID component may perform similar or same operations (e.g., reads and writes), the components may not be grouped as the same type of-component because the operations may be handled in a completely different way. One or more components may also be categorized as a type of component based on similar or same commands of the one or more components. For example, flash disks may perform similar or same commands, so the flash disks may be grouped as one type of component. Some components may also be grouped as a type of component based on same supplier, model, etc.

The latent error detector 101 may be configured to obtain execution information from a source such as configuration data 230. The execution information may specify which components, which modules and other information for execution of the latent error detector 101. In one embodiment, the execution information may be manually input into a file and stored as configuration data 230. In another embodiment, the execution information may be received as data from a software module that generates configuration data 230. The framework 200 may be configured to access configuration data 230 to obtain data specifying execution information for the latent error detector 101. In one embodiment, the configuration data 230 may specify one or more types of components to check for latent errors. For each component type, the configuration data 230 may specify a single reference to access one or more components of the same type. For example, the type of component may be network adapter and configuration data 230 may specify a single reference to access one or more network adapters of the same type. Depending on the type of component, the single reference for accessing the one or more components may be an operating system path, for example. The path may specify a directory path for accessing the one or more components. The path may be specified as a regular expression. Regular expressions denote a string of characters in which some of the characters, also called metacharacters, have special meanings that allow for searching of data based on patterns. The path may specify a location for each component with a wild card metacharacter as part of the path. For example, configuration data 230 may specify a directory path which includes a wild card metacharacter signifying to an operating system to determine the location for each component during execution.

The configuration data 230 may also specify a name of a module that may be used to perform a check operation to reveal latent errors for the type of component. For example, configuration data 230 may specify Module C (e.g., module

250c) as the module that may be used to perform a check operation to reveal latent errors for a specific type of component.

The configuration data 230 may also specify a number of threads that each module can use during execution of the latent error detector 101. An operating system may process a part of a software program, such as the latent error detector 101, independent of other parts of the software program. The operating system may process independent parts of the software program, called threads, concurrently. The configuration data 230 may specify that the latent error detector 101 use as many threads as possible based on a computer system's current resources and load. Alternatively, configuration data 230 may specify N threads where N is greater than zero and N is the maximum number of threads that may be used by each module during execution of the latent error detector 101. The configuration data 230 may also specify a schedule for calling each module. The schedule for processing each module may be specified as sequentially, meaning the framework 200 may call each module one at a time. Alternatively, the schedule may be specified as parallel, meaning the framework 200 may call modules concurrently.

Configuration data 230 may specify execution information for the latent error detector 101 to identify one or more types of latent errors within one or more components. Note that if the configuration data 230 is modified, the latent error detector may be restarted to recognize changes to the configuration data 230. An exemplary configuration data 230 may specify disk drives as the type of component. For example, the configuration data 230 may specify a reference for accessing the type of component as a directory path identified as /dev/rdsk/c*s2. The directory path may include a wild card metacharacter indicating the reference for accessing the disk drives may be determined during execution. The schedule for processing threads may be specified as round robin and number of threads specified as needed. The schedule for processing threads may also be specified as parallel.

In one embodiment, the framework 200 may be configured to call one or more modules to perform a check operation that causes a latent error to be detected. For example, one module, such as module 250a referred to as Module A, may be configured to initiate a check operation to detect a particular error within a particular type of component. Another module, such as module 250b referred to as Module B, may be configured to initiate a check operation to detect a particular error within another type of component. Thus, a module may be configured specifically to identify latent errors within a type of component. A module may be configured to detect one or more latent errors, or one or more types of latent errors, for the type of component. For example, a module may be configured to detect a single latent error, multiple latent errors, or multiple types of latent errors within one type of component. The latent error detector 101 may include any number of modules as illustrated by module 250n referred to as Module N, where N indicates any number of modules. For example, a module may be configured to initiate a check operation that reveals if a database is accessible (e.g., alive and able to perform as expected). Another module may be configured to initiate a check operation that reveals whether one or more network adapters are operating as expected.

The one or more modules may discover latent errors during execution of the latent error detector 101. Therefore, for example, a latent error may not be revealed by a module. Furthermore, the latent error detector may discard results of a check operation performed by a module and a component may generate an indication of an error instead of the module. For example, a module may be configured to discard the results of read operations initiated during detection of latent errors within a storage device. The storage device may send an error indication to an operating system if the storage device is unable to perform one of the read operations. In some embodiments, the module may generate additional error indications (e.g., an error message) in response to detection of an error within a component being tested.

In one embodiment, modules 250a to 250n may be software modules configured to alter, enhance, or extend functionality of the framework 200, or the base module of the latent error detector 101. For example, modules 250a to 250n may be plug-ins which add additional functionality to the framework 200. Modules 250a to 250n may be dynamic shared objects, with one dynamic shared object to detect latent errors for each type of component. Modules 250a to 250n may each be a software module configured to operate with the framework 200 without imposing any software changes to the framework 200. For example, when a user of the latent error detector 101 desires to add a module to detect latent errors for a particular type of component, the module may be added to operate with the framework 200 without any software changes to the framework 200. A module may be added to support a new type of component or to detect a new latent error. Thus, the latent error detector may later be reconfigured to identify latent errors within other types of components. The latent error detector may be reconfigured to include, or remove, detection of latent errors within types of components.

The following describes an exemplary framework 200 and exemplary software routines that may be configured as part of modules 250a to 250n to interface the framework 200 to the modules 250a to 250n. The examples are for one embodiment of a latent error detector 101. A main interface between the framework 200 and the modules 250a to 250n may include two parts, an implicit part and an explicit part. The main interface may be configured to enable software integration between the framework 200 to the modules 250a to 250n. The implicit part may be a pair of software routines that may be provided by each module to add and/or remove error detection functionality for a type of component. One software routine may be called by the modules 250a to 250n to interface or attach the modules 250 to 250n to the framework 200. The software routine may be called by the modules 250a to 250n during initialization (e.g., during execution of a software routine to add error detection functionality). Another software routine may be called by the modules 250a to 250n to eliminate an interface to, or detach, the modules 250a to 250n from the framework 200. This software routine may be called by the modules 250a to 250n during execution of a software routine to remove error detection functionality.

The explicit part of the main interface may be a software structure that may be used to store references, such as software pointer variables, to various software routines and other software variables. The explicit part may encapsulate the main interface between the framework 200 and the modules 250a to 250n or enable software integration between the framework 200 and the modules 250a to 250n. Entries may be included as part of the software structure to provide the main interface between the framework 200 and the modules 250a to 250n. For example, an entry may be a name of a software pointer variable that points to a particular software routine and the entry may be stored in the software structure to enable access to the particular software routine.

One entry may point to a component identifier software routine configured as part of the modules 250*a* to 250*n*. The component identifier software routine may be configured to scan or identify one or more components that match a regular expression passed as a variable to the component identifier software routine when the component identifier software routine is called by the framework 200. For example, the regular expression may specify a directory path with a wild card metacharacter and the component identifier software routine may manipulate the directory path to identify the components that match a pattern in the regular expression. Thus, the component identifier software routine may be called by the framework 200 to generate data that identifies references to access the one or more components. For example, a module configured to reveal latent errors in storage devices may include the component identifier software routine to scan or identify the names and directory paths to each of the storage devices. A module configured to reveal latent errors in network adapters may include the component identifier software routine to scan or identify the names and references to access each of the network adapters.

One entry may point to an operation initiator software routine configured as part of the modules 250*a* to 250*n*. The operation initiator software routine may be configured to initiate an operation to detect latent errors within one or more components. References to access each of the one or more components may have been identified by the component identifier software routine, as described above. The framework 200 may call the operation initiator software routine that initiates the check operation for each component identified by the component identifier software routine. For example, the framework 200 may call a component identifier software routine that initiates a check operation for a storage device. The component identifier software routine may be configured as part of a module and the module may be configured to reveal latent errors in that type of storage device. A maximum number of threads (e.g., as specified in configuration data 230) may be passed as a variable to the operation initiator software routine when the operation initiator software routine is called by the framework 200. If the operation initiator software routine identifies a latent error, the operation initiator software routine may be configured to return an indication of an identified latent error once the operation initiator software routine has completed execution. The operation initiator software routine, using an error generator software routine configured as part of modules 250*a* to 250*n*, and described below, may print an error message if a latent error is discovered.

A variable in the software structure (e.g., explicit part) may contain a name of a type of component managed by the latent error detector 101. Other variables may be included as part of the structure and used to provide additional functionality by the modules 250*a* to 250*n*. For example, a module may be configured to set a flag variable to be passed to the framework 200 that may indicate a particular configuration for a type of component. A flag may be set to indicate a storage device array is mirrored when the flag is set to true.

According to one embodiment, the following are exemplary software routines that may be provided by the framework 200 and configured to be used as part of or with modules 250*a* to 250*n*. One software routine may print messages if the framework 200 is informed to print messages. For example, a particular variable (e.g., a flag) may be sent from the software routine to the framework 200 and may specify to the framework 200 whether messages should be printed. Messages may be printed to provide information about the execution of the latent error detector 101 to a user. For example, messages may be printed to inform a user of each completion of a check for latent errors within components. The messages may be printed to a standard input/output (I/O) device. Which I/O device is used may depend on whether the latent error detector is executing as a background or foreground process.

One exemplary software routine may print an error message. In one embodiment, the error message may be printed to a standard input/output (I/O) device such as a system error feature or a system logging feature of an operating system. The system logging feature, for example, may send the error message to a system logging daemon. The system logging daemon may read and log messages to a system console, log files, other computers and/or users as specified by a configuration file of the system logging daemon. The system logging daemon may wait for incoming messages and direct the messages to possible output locations. A software program external to the latent error detector 101 may be one of many output locations. For example, an external software program may monitor the error messages logged by modules 250 to 253. The error messages logged by modules 250 to 253 may be sent to the system logging feature of an operating system. The external software program may handle the error messages, which indicate a latent error for one or more components, as part of normal operations of the external software program. Conversely, a component may detect a latent error and may generate an error as part of normal operations of the component.

Other types of software routines may be included to perform internal processing as needed by the latent error detector 101. Such software routines may be used by the latent error detector 101 as reusable utility-type functions. For example, one routine may receive a directory and file name, combine the directory and file name together and return a pointer to a new variable that indicates a combined directory and file name. A different software routine may receive a regular expression and convert the regular expression to a command that may be executed. Another software routine may add a pathname to be managed to an internal list of managed paths, returning −1 if the addition was unsuccessful, 0 if the addition was successful, and 1 if the entry was already in the list (e.g., already an entry so may not be added again). The framework 200 may maintain the internal list of paths to identify one or more components.

The latent error detector 101, as shown in FIG. 2, may be a software application, software program instructions, software package, etc. For example, the latent error detector 101 may be a stand-alone software application or may be included as part of an operating system software package. Note that the framework 200, module(s) 250 and configuration data 230 are exemplary embodiments. Other embodiments, for example, may be configured to minimize functionality complexity of the modules 250. The framework 200 and/or modules 250 may be implemented in various ways. The latent error detector 101 may include a command line interface or a graphical user interface (or both) for providing editing access to the configuration data 230. The latent error detector 101 may be implemented using a variety of programming languages, including procedure-based techniques, component-based techniques, and/or object-oriented techniques, among others. For example, the latent error detector 101 may be a software application written with C++ for use in a distributed computing environment.

The latent error detector 101 may perform operations that cause latent errors within one or more types of components to be revealed. The latent error detector 101 may be configured to implement functionality in addition to detecting latent errors. For example, the latent error detector 101 may include a module for a disk suite volume manager component that is configured to signal the disk suite volume manager when an active side of a mirror is in a degraded state but has not completely failed. The disk suite volume manager may be configured to switch to another side of the mirror. Thus, the latent error detector 101 may be configured to resolve a latent error after the latent error has been discovered.

In one embodiment, the framework 200 may be configured as a software daemon that executes as a background process of an operating system. As a background process, the framework 200 may continue to execute other operating system commands such as reading data stored on a disk. For example, as a background process with a lower priority than foreground processes, the framework 200 may not interfere with interactive processes that may also be executing on the computer system. The framework 200 may start execution automatically when the computer system is booted or rebooted. For example, the framework 200 may be configured to start by default as part of a computer system's boot or reboot process. Alternatively, the framework 200 may be configured as a foreground process and may be executed from a command line interface of the operating system.

Figure 3:
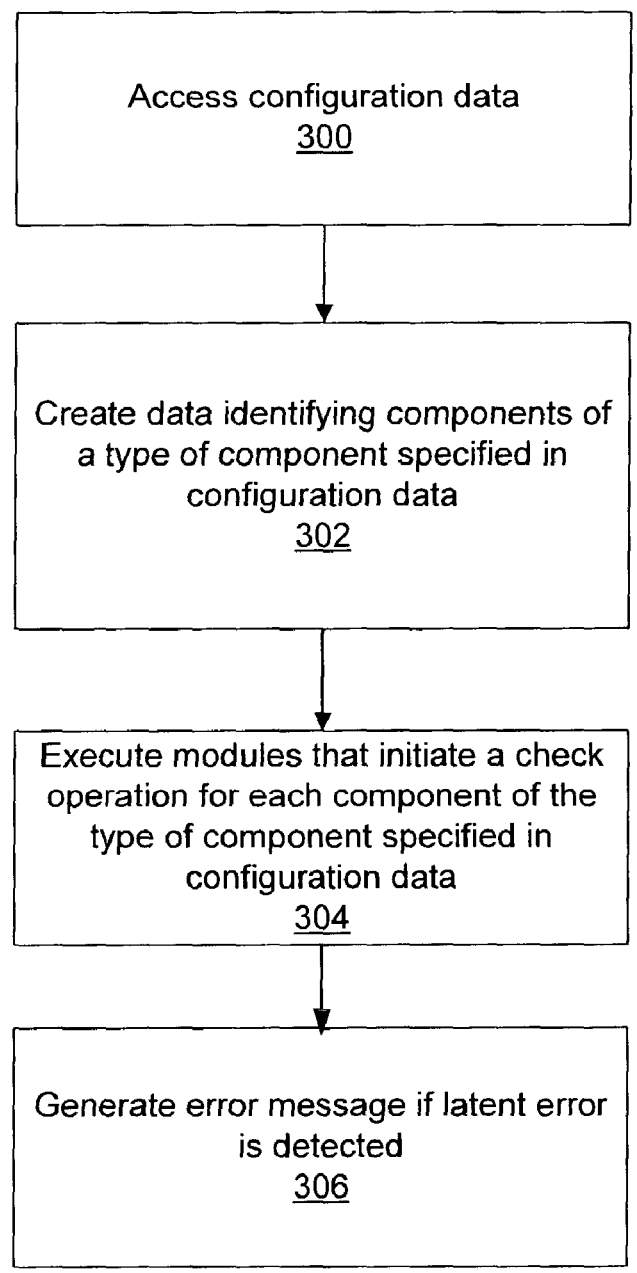
FIG. 3 shows one embodiment of a process for identifying undetected errors within one or more components coupled to a computer system.

Turning to the flowchart of FIG. 3, one embodiment of a process for identifying latent errors within one or more components coupled to a computer system is shown. A latent error detector may include a latent error detector framework. The latent error detector framework may be a software program and may be configured as a main module for accessing one or more other modules. In one embodiment, the framework may be configured as an operating system daemon. The framework daemon may be affected by operating system scheduling. For example, the framework daemon may be scheduled by an operating system as a low priority while checking for latent errors.

The framework may be configured to access a source for configuration data, as indicated in 300. In one embodiment, the configuration data may specify a type of component the latent error detector will check for latent errors (if any components of that type are currently included in the system). The configuration data may specify a reference used to access one or more components of the same type. For example, the type of component may be network adapter and configuration data may specify a reference to access one or more network adapters of the same type. The framework may also be configured to call the modules one at a time or concurrently as specified in the configuration data. The configuration data may also specify a number of threads that each module can use during execution of the latent error detector. The configuration data may specify that each module use as many threads as possible based on a computer system's current resources and load or use a maximum number of threads.

In one embodiment, the framework may be configured to create data identifying components of a type of component specified in the configuration data, as indicated in 302. The latent error detector may read the configuration data, verify that the components can be identified and accessed, and create the component identifier data. For example, a latent error detector may read configuration data to recognize a type of component is a disk drive and to obtain a name of a module associated with the disk drive, verify that each disk drive indicated in the configuration data can be identified and accessed, and then create component identifier data for each disk drive.

The framework may execute one or more modules for each component of a type of component specified in the configuration data, as indicated in 304. In one embodiment, a framework configured as a scheduler may initiate check operations to reveal latent errors at different intervals. For example, the framework may periodically call each module that initiates a component-specific operation to reveal latent errors. The framework configured as a scheduler may call the modules one at a time or concurrently. If the maximum number of threads is specified in the configuration data, each module may use the maximum number of threads. Otherwise, each module may use as many threads as possible based on a computer system's current resources and load.

The one or more modules may then generate an error indication, as indicated in 306. The error indication may be generated if a latent error is discovered. The latent error detector may be configured to discard results of an operation performed by a module and a component may generate an error indication instead of or in addition to the module. For example, a module may be configured to discard results found during initiation of reads to a storage device. The storage device may send an error indication to an operating system to reveal a latent error within the storage device.

If a latent error is revealed, the latent error may be logged to a system error feature or a system logging feature of an operating system by a software routine executed as part of the latent error detector. The system logging feature, for example, may send error messages to a system logging daemon. A software program external to the latent error detector may monitor an output location that stores the error messages. The output location may include the latent error as an error message. The external software program may handle the error messages, which revealed a latent error for one or more components, as part of normal operations of the external software program.

Figure 4:
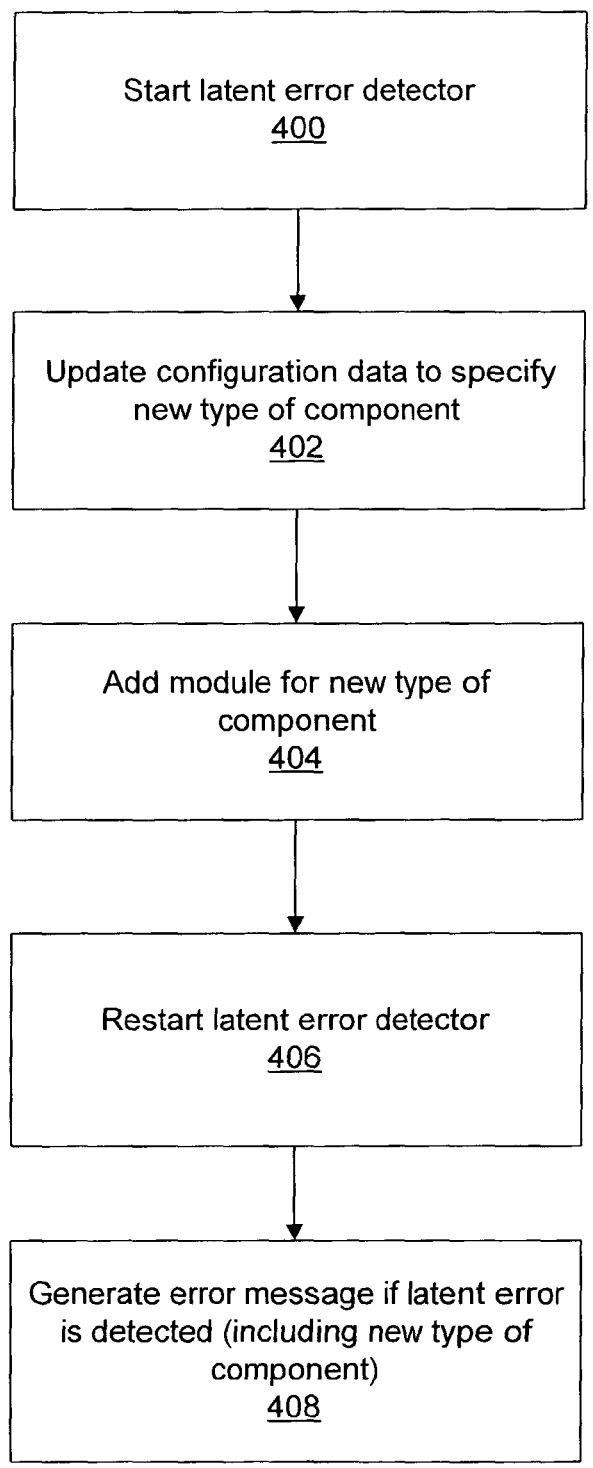
FIG. 4 shows one embodiment of a process for configuring a latent error detector to identify undetected errors within a new type of component.

The latent error detector may be reconfigured to identify latent errors within other types of components. The latent error detector may be reconfigured to include, and/or remove, detection of latent errors within different types of components. Thus, modules may be added to check for latent errors within different types of components and/or removed to eliminate checking for latent errors within different types of components. The one or more modules may be dynamic shared objects. Turning to the flowchart of FIG. 4, an embodiment of a process for adding a module to detect latent errors for a new type of component is shown. The new module may be added to identify undetected errors within the new type of component. Consequently, a module may be added to detect latent errors within the new type of component. Execution of a latent error detector is initiated, as indicated in 400. Thus, one embodiment of a process for identifying undetected errors within one or more components, as shown in FIG. 3, may be started. The latent error detector may be started in various ways. For example, the latent error detector may start by default as part of a computer system's boot process.

A user may update configuration data to identify the new type of component, as indicated in 402, and add a module for the new type of component, as indicated in 404. Conversely, a module for the new type of component may already be included in the latent error detector. After a new component associated with the new type of component is installed, the user may update configuration data to indicate the new type of component. After the configuration data is modified and module is included, the latent error detector may restart, as indicated in 406. In some embodiments, the latent error detector may perform error detection for new type of component automatically. Initiation of the restart, if needed, may be performed in various ways. For example, a user may manually stop execution of the latent error detector and manually restart execution. Alternatively, other processes external to the latent error detector may dictate when execution starts and stops. Once the latent error detector starts again, the added module may initiate an operation involving the new type of component that causes a latent error within the new type of component to be detected. An error indication may be generated (by the component and/or the module) if a latent error is discovered within the new type of component, as indicated in 408. Other modules may identify latent errors for other types of components. A latent error may not be revealed. If a latent error is revealed, the latent error may be logged to a system error feature or a system logging feature of an operating system.

Figure 5:
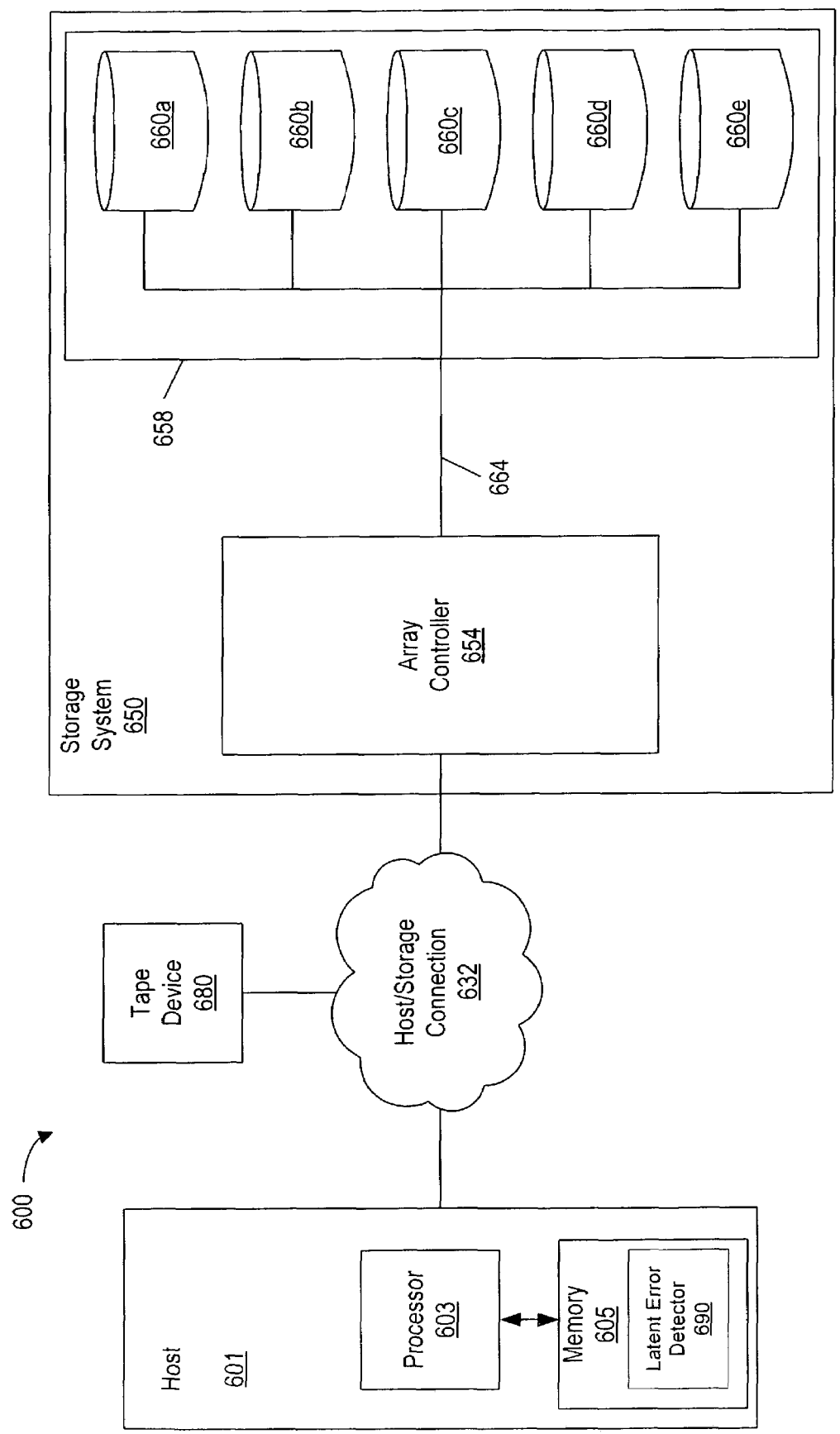
FIG. 5 illustrates a block diagram of a data processing system that includes one or more components accessible to a latent error detector, according to one embodiment.

FIG. 5 shows one embodiment of a data processing system that includes one or more components. A latent error detector 690 may be executed to identify latent errors within the one or more components. Data processing system 600 includes a host 601 connected to a tape device 680 via host/storage connection 632. The host 601 is also connected to a storage system 650 via the host/storage connection 632. Host/storage connection 632 may be, for example, a local bus, a network connection, an interconnect fabric, or a communication channel. Storage system 650 may be a RAID storage subsystem or other type of storage array. In some embodiments, multiple hosts 601 may communicate with several storage systems 650 via host/storage connection 632.

One or more tape devices 680 (e.g., a single tape drive, a multiple drive device, an automated tape library, a jukebox-type tape device, etc.) are also included as components in data processing system 600. In one embodiment, data stored in storage system 650 may be backed up to tape device 680. Each tape device may include one or more tape drives configured to read and write data to one or more tapes. Thus, tape device 680 provides a means for accessing one or more tapes. In one embodiment, the latent error detector may be configured to execute a module to detect latent errors for the one or more tape devices 680. The module may perform an operation, such as a read or write, to cause a latent error to be revealed.

Included in storage system 650 is a storage device array 658 that includes a several storage devices 660a-660e (collectively referred to as storage devices 660). Thus, the storage device array 658 component includes other components such the storage devices 660a-660e. Storage devices 660a-660e may be, for example, magnetic hard disk drives, optical drives, magneto-optical drives, tape devices, solid state storage, or other non-volatile memory. As shown in FIG. 5, storage devices 660 are disk drives and storage device array 658 is a disk drive array. Although FIG. 5 shows a storage device array 658 having five storage devices 660a-660e, the number of storage devices 660 in storage device array 658 may vary and is not limiting.

Storage system 650 also includes an array controller 654 component connected to each storage device 660 in storage array 658 via one or more data paths 664. Data path 664 may provide communication between array controller 654 and storage devices 660 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc. Depending on the design of storage system 650, the array controller 654 may take many forms.

In one embodiment, the latent error detector may be configured to execute a module to detect latent errors for each storage device 660 in storage array 658. The storage device 660a-660e may be grouped as a type of component with similar or same operations performed in the same way. The module may perform an operation, such as a read, to cause a latent error to be revealed. Each block of storage device 660 may be read while attempting to reveal a latent error.

Although FIG. 5 shows the storage device array 658, the storage devices 660a-660e, the processor 603, the memory 605, the storage system 650, etc as components of the data processing system 600, the number and type of components may vary and is not limiting. For example, although not illustrated, the data processing system 600 may also include numerous network adapters as components of the system. A module to determine if a connection is available, for example, may be included to reveal a latent error with the network adapters.

The latent error detector 101 may be stored on various computer accessible media. Examples of computer accessible media include hard disk storage, floppy disk storage, removable disk storage, flash memory or random access memory (RAM). Computer accessible media may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. Computer accessible media may include other types of memory as well, or combinations thereof. In addition, the computer accessible medium may be located in a first computer in which the computer programs are executed, or may be located in a second different computer which connects to the first computer over a network through one or more components such as network adapters. In the latter instance, the second computer may provide the program instructions to the first computer for execution.

In different embodiments, a computer system executing a latent error detector may take various forms, including a personal computer system, desktop computer, notebook computer, workstation, server, mainframe computer system, network appliance, network computer, Internet appliance, personal digital assistant (PDA), embedded device, smart phone, television system, another suitable device, or combinations thereof. In general, the term computer system may be broadly defined to encompass any device having a processor which executes instructions from a computer accessible medium. The computer system may be attached to a network as part of a distributed computing environment.

The computer system may be configured to execute one or more computer programs stored on a computer accessible medium. The computer programs may comprise an operating system or other system software, application software, utility software, applets, and/or any other sequence of instructions. Typically, an operating system performs basic tasks such as recognizing input from a keyboard, sending output to a display screen, keeping track of files and directories on a disk, and controlling I/O devices such as scanners and printers. In different embodiments, the operating system may be Windows NT from Microsoft, Inc., Solaris from Sun Microsystems, Inc., or any other operating system suitable for the computer system.

Note that the flow charts described herein represent exemplary embodiments of methods. The methods may be implemented in software, hardware, or a combination thereof. The order of method may be changed, and various elements may be added, reordered, combined, omitted, modified, etc. For example in FIG. 3, during execution of multiple modules that each cause a component-specific operation to be initiated, the latent error detector may generate an error message (306) before, after or during execution of each module (304). As an additional example, a module associated with a new type of component may be added (404) before, after or during updating of configuration data to specify the new component (402).

Various modifications and changes may be made as would be obvious to a person skilled in the art having the benefit of this disclosure. Note also that the flow charts described herein do not necessary require a temporal order. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
    a plurality of components;
    a memory; and
    one or more processors coupled to the memory, wherein the memory is configured to store program instructions executable by the processor to implement a latent error detector, wherein the latent error detector comprises:
        a plurality of modules, wherein each module of the plurality of modules is configured to initiate one or more component-specific operations to reveal a latent error within a specific type of component, wherein each module of the plurality of modules is specific to a different type of component; and
        a framework configured to execute one or more of the plurality of modules for each type of component as a low priority background task, wherein each module of the plurality of modules is separately pluggable within said framework;
    wherein the plurality of components comprises one or more components of each of the different types of components.

2. The system as recited in claim 1, further comprising configuration data specifying the one or more types of components and the one or more modules for each type of component.

3. The system as recited in claim 2, wherein the latent error detector is configurable to check for latent errors for a new type of component by plugging in a new module specific to the new type of component in the framework and by specifying in the configuration data the new type of component.

4. The system as recited in claim 2, wherein the latent error detector is configurable to eliminate checking for latent errors for a specific type of component by removing an existing module associated with the specific type of component from the plurality of modules and by removing the specific type of component from the configuration data.

5. The system as recited in claim 2, wherein the configuration data comprises a reference including a wildcard character, wherein the wildcard character signifies to the framework to determine one or more component-specific references to access each of the one or more components.

6. The system as recited in claim 2, wherein the configuration data further specifies a parameter indicative of a number of concurrent threads of execution for use by a corresponding one of the modules to initiate one or more component-specific operations to reveal a latent error.

7. The system as recited in claim 6, wherein a particular value of the parameter indicates that the corresponding module can use a maximum number of threads allowed by an operating system for the system for performing the component-specific operations.

8. The system as recited in claim 6, wherein the value of the parameter indicates a limited number of threads that the corresponding module can use for performing the component-specific operations.

9. The system as recited in claim 2, wherein the configuration data further specifies a schedule, wherein the schedule indicates for the framework to process each of the plurality of modules sequentially one at a time during execution of the latent error detector.

10. The system as recited in claim 2, wherein the configuration data comprises schedule information indicating when the framework should call each module to check for latent errors.

11. The system as recited in claim 1, wherein one or more of the plurality of modules is configured to send an error indication to a system logging feature of an operating system if the component-specific operation reveals the latent error.

12. The system as recited in claim 1, wherein one or more of the plurality of modules is configured to discard results of the component-specific operation and the component-specific operation causes an error indication to be sent to a system logging feature of an operating system if the component-specific operation reveals the latent error.

13. The system as recited in claim 1, wherein one or more of the plurality of modules is configured to reveal multiple types of latent errors within one of the types of components.

14. The system as recited in claim 1, wherein each of the plurality of modules comprises a pluggable set of program instructions configured to operate with the framework without imposing modifications to the framework.

15. The system as recited in claim 1, wherein one or more of the plurality of modules is configured to resolve the latent error if the component-specific operation reveals the latent error.

16. The system as recited in claim 1, wherein the framework is configured to execute as a background process.

17. The system as recited in claim 2, wherein the framework calls each module of the plurality of modules to initiate the component-specific operation at different intervals wherein the time interval between successive calls of a given module is specified in the configuration data.

18. The system as recited in claim 1, wherein the one or more components include at least one of a database, a storage device and a network adapter.

19. A method, comprising:
    accessing configuration data specifying one or more types of components and one or more modules for each type of component, wherein a plurality of components comprise one or more components of the one or more types of components; and
    a framework monitoring system activity and initiating the one or more modules as specified by the configuration data when system activity is below a specified threshold, wherein said framework is configured to accept a plurality of modules, wherein each module is specific to a different type of component and is separately pluggable within said framework; and in response to said initiating, each of the one or more initiated modules performing a component-specific operation to reveal a latent error within one or more components of the type of component corresponding to the module.

20. The method as recited in claim 19, further comprising creating data identifying references to access each of the one or more components of the one or more types of components specified by the configuration data.

21. The method as recited in claim 20, wherein said performing a component-specific operation further comprises performing the component-specific operation for each of the one or more components identified by the references.

22. The method as recited in claim 19, further comprising adding a new module associated with a new type of component to the one or more modules to check for latent errors within the new type of component and specifying the new type of component in the configuration data.

23. The method as recited in claim 19, further comprising removing an existing module associated with a specific type of component from the one or more modules to eliminate checking of latent errors for the specific type of component and removing the specific type of component from the configuration data.

24. The method as recited in claim 19, wherein said performing further comprises sending an error indication to a system logging feature of an operating system if the component-specific operation reveals the latent error.

25. The method as recited in claim 19, wherein said performing further comprises discarding results of the component-specific operation and the component-specific operation causing an error indication to be sent to a system logging feature of an operating system if the component-specific operation reveals the latent error.

26. The method as recited in claim 19, wherein the configuration data comprises a reference including a wildcard character, wherein the wildcard character signifies that a corresponding module is to be initiated for all components of a type corresponding to the reference.

27. The method as recited in claim 19, wherein said initiating further comprises executing the one or more modules according to a number of threads, wherein the number of threads are specified in the configuration data.

28. The method as recited in claim 27, wherein the number of threads is specified as zero to indicate each of the one or more modules can use the number of threads allowed by a system.

29. The method as recited in claim 27, wherein the number of threads is specified as greater than zero to indicate the maximum number of threads each of the one or more modules can use.

30. The method as recited in claim 19, wherein the configuration data comprises schedule information indicating when the one or modules are to be initiated.

31. The method as recited in claim 30, wherein the schedule information indicates whether the modules are to be initiated sequentially or concurrently.

32. The method as recited in claim 19, wherein one or more of the modules is configured to reveal multiple types of latent errors within one or more types of components.

33. The method as recited in claim 19, wherein each of the one or more modules comprises a pluggable set of program instructions configured to operate with the framework without imposing modifications to the framework.

34. The method as recited in claim 19, further comprising resolving the latent error if the component-specific operation reveals the latent error.

35. The method as recited in claim 19, wherein said initiating the one or more modules comprises the framework executing as an operating system daemon and initiating the one or more modules as a low priority background process.

36. The method as recited in claim 19, wherein the threshold is specified in the configuration data.

37. A computer accessible medium comprising program instructions, wherein the instructions are computer-executable to implement a latent error detector, wherein the latent error-detector includes:

a plurality of modules, wherein each module of the plurality of modules is configured to initiate one or more component-specific operations to reveal a latent error within a specific type of component, wherein each module of the plurality of modules is specific to a different type of component; and a framework configured to execute one or more of the plurality of modules as a low priority background task, wherein each module of the plurality of modules is separately pluggable within said framework;

wherein the plurality of components comprises one or more components of each of the different types of components.

* * * * *